United States Patent
Cai et al.

(10) Patent No.: US 12,119,650 B2
(45) Date of Patent: Oct. 15, 2024

(54) OPTIMAL POWER FLOW-BASED HIERARCHICAL CONTROL METHOD FOR DISTRIBUTED ENERGY STORAGE SYSTEM (ESS)

(71) Applicant: State Grid Hubei Electric Power Research Institute, Hubei (CN)

(72) Inventors: Defu Cai, Hubei (CN); Kunpeng Zhou, Hubei (CN); Zuowei Wang, Hubei (CN); Xiaohui Li, Hubei (CN); Li Wan, Hubei (CN); Haiguang Liu, Hubei (CN); Rusi Chen, Hubei (CN); Wenna Wang, Hubei (CN); Tao Wang, Hubei (CN); Liangyi Zhang, Hubei (CN); Guanqun Sun, Hubei (CN); Erxi Wang, Hubei (CN)

(73) Assignee: State Grid Hubei Electric Power Research Institute, Wuhan (CN)

( * ) Notice: Subject to any disclaimer, the term of this patent is extended or adjusted under 35 U.S.C. 154(b) by 0 days.

(21) Appl. No.: 17/923,917

(22) PCT Filed: Sep. 1, 2022

(86) PCT No.: PCT/CN2022/116400
§ 371 (c)(1),
(2) Date: Nov. 8, 2022

(87) PCT Pub. No.: WO2023/173698
PCT Pub. Date: Sep. 21, 2023

(65) Prior Publication Data
US 2024/0222976 A1    Jul. 4, 2024

(30) Foreign Application Priority Data
Mar. 14, 2022  (CN) .......................... 202210249224.0

(51) Int. Cl.
H02J 3/16   (2006.01)
H02J 3/24   (2006.01)
H02J 3/28   (2006.01)

(52) U.S. Cl.
CPC .................. *H02J 3/28* (2013.01); *H02J 3/16* (2013.01); *H02J 3/241* (2020.01); *H02J 2203/10* (2020.01); *H02J 2203/20* (2020.01)

(58) Field of Classification Search
CPC ...... H02J 3/28; H02J 3/16; H02J 3/241; H02J 2203/10; H02J 2203/20; H02J 3/38;
(Continued)

(56) References Cited

FOREIGN PATENT DOCUMENTS

| CN | 104319775 A | * | 1/2015 | |
|----|-------------|---|--------|--|
| CN | 112152268 A | * | 12/2020 | ............. G06F 30/20 |

OTHER PUBLICATIONS

Translate (Year: 2015).*
Translate (Year: 2020).*

* cited by examiner

*Primary Examiner* — Elim Ortiz

(57) ABSTRACT

Disclosed is an optimal power flow-based hierarchical control method for a distributed energy storage system (ESS), where the method divides control of an energy storage cluster into three layers, performs primary and secondary control to realize intra-cluster control, and performs tertiary control to realize inter-cluster control. In the primary control, droop coefficients are set to realize intra-cluster basic power distribution. In the secondary control, a frequency/voltage shift and uneven power distribution that are caused by a droop are compensated for based on a consistency algorithm. In the tertiary control, a central controller is set, a solution of an optimal power flow is calculated and delivered to each cluster as a control signal, and the control signal is tracked in real time through the secondary control (Continued)

and the primary control. The method adjusts a reference voltage of each energy storage cluster without requiring a common bus.

3 Claims, 4 Drawing Sheets

(58) Field of Classification Search
CPC .... H02J 3/381; H02J 3/388; H02J 3/40; H02J 9/06; H02J 9/062; H02J 3/30; H02J 3/32; H02J 9/068; H02J 9/08; H02J 2300/20; H02J 2300/10
USPC ............ 700/286, 291, 295, 297; 702/61, 62; 324/124; 340/870.02
See application file for complete search history.

In tertiary control, take a reference voltage of each cluster as a control variable and line loss minimization as an optimization objective, set and solve an objective function, and deliver a control signal to each cluster

→

Perform secondary and primary control in each cluster to track the control signal in real time, and complete frequency and voltage recovery and accurate power distribution

FIG. 1

OPTIMAL POWER FLOW-BASED HIERARCHICAL CONTROL METHOD FOR DISTRIBUTED ENERGY STORAGE SYSTEM (ESS)

TECHNICAL FIELD

The present disclosure relates to the technical field of electrical engineering, and specifically, to an optimal power flow-based hierarchical control method for a distributed energy storage system (ESS).

BACKGROUND

As a large number of renewable energy sources such as photovoltaic and wind power are connected to a power system by using power electronic equipment, increasing ESSs are installed in a power grid as an indispensable part of stabilizing fluctuation of new energy power generation. In addition, a capacity of a single ESS is usually small. In the future, a large number of energy storage clusters need to be disposed in the power grid, so as to participate in a dynamic adjustment process of the power grid on a large scale.

A single communication and control architecture is difficult to support collaborative control of the energy storage clusters, and lacks efficient communication and coordinated control technologies. In addition, different energy storage stations may be in different states, and ESSs vary in parameters such as a state of charge (SoC), a capacity configuration, maximum charging power, and maximum discharging power. There is no effective means to achieve coordinated control for these decentralized ESSs, and as a result, the capacity of the single ESS is idle and cannot be fully used. The lack of an efficient large-scale integrated control technology greatly reduces an adjustment capacity and application space of the energy storage cluster. How to aggregate the decentralized ESSs to coordinate small and medium-sized energy storage devices and provide a large response capacity for the power system is a key to improve operation efficiency of the energy storage cluster.

In traditional hierarchical control of a distributed ESS, output power of the energy storage cluster is usually controlled to reduce a line loss, but this method requires that each energy storage cluster have a common bus to measure the output power of the energy storage cluster. This condition may not be met in the distributed ESS.

SUMMARY

To overcome the defects or meet the improvement demands in the prior art, the present disclosure provides an optimal power flow-based hierarchical control method for a distributed ESS, to adjust a reference voltage of each energy storage cluster without requiring a common bus, to achieve more flexible control. This can effectively reduce a line loss, ensure effectiveness of droop-based secondary control of a distributed ESS, and improve system operation efficiency, so as to resolve a technical problem that an existing single communication and control architecture is difficult to support collaborative control of energy storage clusters.

To achieve the above objective, according to an aspect of the present disclosure, an optimal power flow-based hierarchical control method for a distributed ESS is provided, where the method is used to perform cluster-based control on a large-scale distributed energy storage cluster, and the method includes:

dividing a distributed ESS into a plurality of clusters by distance;

performing tertiary control to realize inter-cluster control; and performing primary control and secondary control to realize intra-cluster control; where the tertiary control is specifically as follows: setting a central controller, calculating a solution of an optimal power flow, delivering the solution of the optimal power flow to each cluster as a control signal, adjusting a reference voltage of each cluster once each time the control signal is sent, and tracking the control signal in real time through the secondary control and the primary control;

the primary control is specifically as follows: setting a frequency droop coefficient and a voltage droop coefficient, setting a reference frequency of an output voltage of an energy storage converter to be equal to a value obtained by subtracting active power multiplied by the frequency droop coefficient from a rated frequency, and setting a reference amplitude of the output voltage to be equal to a value by subtracting reactive power multiplied by the voltage droop coefficient from a rated voltage, so as to realize intra-cluster basic power distribution; and the secondary control is specifically as follows: performing, based on a consistency algorithm, weighted summation on deviations between state variables of the active and reactive power of the energy storage converter and state variables of active and reactive power of all energy storage converters communicating with the energy storage converter, to obtain a sum value, where a weight used for the weighted summation is a communication weight between the energy storage converters; performing error correction on the sum value to obtain a power distribution adjustment correction amount of the energy storage converter; performing weighted summation on deviations between the power distribution adjustment correction amount of the energy storage converter and power distribution adjustment correction amounts of all the energy storage converters communicating with the energy storage converter, to obtain frequency and voltage adjustment correction amounts of the energy storage converter, where a weight used for the weighted summation is the communication weight between the energy storage converters; and compensating for, based on the frequency and voltage adjustment correction amounts of the energy storage converter, frequency and voltage amplitude shifts of an output voltage of a single energy storage converter and uneven power distribution among a plurality of energy storage converters in the cluster, where the frequency and voltage amplitude shifts and the uneven power distribution are caused by a frequency droop and a voltage droop in the primary control.

Further, the primary control and the secondary control are fully distributed and realized through sparse communication between neighbors, and corresponding formulas are as follows:

$$\begin{cases} v_{oki}^d = v_n - n_{ki}Q_{ki} + \Omega_{ki} + T_{ki} \\ \phantom{v_{oki}^d =} v_{fki}^d \\ v_{oki}^q = v_{fki}^q + \Xi_{ki} \end{cases}$$

-continued
$$\omega_{ki} = \omega_n - m_{ki}P_{ki} + \Psi_{ki}$$

where ki represents an $i^{th}$ energy storage converter in a $k^{th}$ cluster, d represents a direct axis, q represents a quadrature axis, $v_{oki}^d$ and $v_{oki}^q$ respectively represent reference values of direct-axis and quadrature-axis components of an output voltage amplitude of the $i^{th}$ energy storage converter in the $k^{th}$ cluster, $\omega_{ki}$ represents a reference frequency of an output voltage of the $i^{th}$ energy storage converter in the $k^{th}$ cluster, $v_n$ and $\omega_n$ represent the rated voltage and the rated frequency respectively, $n_{ki}$ and $m_{ki}$ represent a voltage droop coefficient and a frequency droop coefficient of the $i^{th}$ energy storage converter in the $k^{th}$ cluster respectively, $P_{ki}$ and $Q_{ki}$ respectively represent active power and reactive power output by the $i^{th}$ energy storage converter in the $k^{th}$ cluster, and $\Omega_{ki}$, $T_{ki}$, $\Xi_{ki}$, and $\Psi_{ki}$ represent additional control variables of the $i^{th}$ energy storage converter in the $k^{th}$ cluster, which are defined as follows:

$$\dot{\Omega}_{ki} = -a_{vki}\left[\sum_{j\in N_i^k} a_{ij}^k(v_{fki}^d - v_{fkj}^d) + g_i^k(v_{fki}^d - v_{frefk}^d)\right]$$

$$\dot{T}_{ki} = -a_{Qki}\sum_{j\in N_i^k} a_{ij}^k(n_{ki}Q_{ki} - n_{kj}Q_{kj})$$

$$\dot{\Xi}_{ki} = -a_{vki}\left[\sum_{j\in N_i^k} a_{ij}^k(v_{fki}^q - v_{fkj}^q) + g_i^k(v_{fki}^q - v_{frefk}^q)\right]$$

$$\dot{\Psi}_{ki} = -a_{\omega ki}\left[\sum_{j\in N_i^k} a_{k,ij}(\omega_{ki} - \omega_{kj}) + g_i^k(\omega_{ki} - \omega_{refk})\right]$$

$$-a_{Pki}\sum_{j\in N_i^k} a_{k,ij}(m_{ki}P_{ki} - m_{kj}P_{kj})$$

where $N_i^k$ represents a set of all energy storage converters communicating with the $i^{th}$ energy storage converter in the $k^{th}$ cluster; $v_{fki}^d$ and $v_{fki}^q$ represent reference values of direct-axis and quadrature-axis components of an intermediate voltage of the $i^{th}$ energy storage converter in the $k^{th}$ cluster respectively; $v_{fkj}^d$ and $v_{fkj}^q$ represent reference values of direct-axis and quadrature-axis components of an intermediate voltage of a $j^{th}$ energy storage converter in the $k^{th}$ cluster respectively; $a_{ij}^k$ represents a communication weight between the $i^{th}$ energy storage converter and the $j^{th}$ energy storage converter in the $k^{th}$ cluster; $a_{vki}$, $a_{Qki}$, $a_{\omega ki}$, and $a_{Pki}$ represent control gains of the voltage, the reactive power, the frequency, and the active power of the $i^{th}$ energy storage converter in the $k^{th}$ cluster respectively; $n_{kj}$ and $m_{kj}$ represent droop coefficients of the $j^{th}$ energy storage converter in the $k^{th}$ cluster; $P_{kj}$ and $Q_{kj}$ respectively represent active power and reactive power output by the $j^{th}$ energy storage converter in the $k^{th}$ cluster; $g_i^k$ represents a leading control gain of the $i^{th}$ energy storage converter in the $k^{th}$ cluster, where when $g_i^k>0$, the energy storage converter directly receives a command value $v_{frefk}^d$ of the direct-axis component of the intermediate voltage and a command value $v_{frefk}^q$ of the quadrature-axis component of the intermediate voltage, or when $g_i^k=0$, the energy storage converter does not receive the command values directly; and $\omega_{refk}$ represents a reference frequency of each energy storage converter in the $k^{th}$ cluster.

Further, the tertiary control is centralized and aims to minimize a total transmission loss of electric energy, a control variable is a reference voltage of each energy storage cluster, and an optimization objective is as follows:

$$\min_{V_{fref}} P_{loss}$$

where $P_{loss}$ represents the total transmission loss of the electric energy, $V_{fref}=[V_{fref1}, \ldots, V_{frefM}]^T$ represents the reference voltage of each energy storage cluster, namely, the control variable, and M represents a quantity of energy storage clusters.

Further, constraints considered in the tertiary control include a power balance constraint, an operation security constraint, and a power output constraint of the energy storage converter; the power balance constraint is expressed by the following formula:

$$\begin{cases} P_{Gi} - P_{Di} - V_i\sum_j V_j(G_{ij}\cos\theta_{ij} + B_{ij}\sin\theta_{ij}) = 0 \\ Q_{Gi} - Q_{Di} - V_i\sum_j V_j(G_{ij}\sin\theta_{ij} - B_{ij}\cos\theta_{ij}) = 0 \end{cases}$$

where $P_{Gi}$ and $Q_{Gi}$ respectively represent active power and reactive power output by an energy storage converter of node i; $P_{Di}$ and $Q_{Di}$ respectively represent active power and reactive power of a load of node i; $V_i$ represents a voltage amplitude of node i, $V_j$ represents a voltage amplitude of node j; $\theta_{ij}$ represents a difference between voltage phase angles of node i and node j; $G_{ij}$ and $B_{ij}$ respectively represent conductance and susceptance of a line between node i and j; node j;

the operation security constraint is expressed by the following formula:

$$\underline{V}_{frefk} \leq V_{frefk} \leq \overline{V}_{frefk}$$

$$\underline{P}_{ij} \leq P_{ij} \leq \overline{P}_{ij}$$

$$\underline{Q}_{ij} \leq Q_{ij} \leq \overline{Q}_{ij}$$

where $V_{frefk}$ represents a reference voltage of a $k^{th}$ cluster; $\underline{V}_{refk}$ and $\overline{V}_{frefk}$ represent upper and lower limits of the reference voltage of the $k^{th}$ cluster respectively; $P_{ij}$ and $Q_{ij}$ respectively represent active power and reactive power transmitted by the line between node i and node j; $\underline{P}_{ij}$ and $\overline{P}_{ij}$ respectively represent upper and lower limits of the active power transmitted by the line between node i and node j; and $\underline{Q}_{ij}$ and $\overline{Q}_{ij}$ respectively represent upper and lower limits of the reactive power transmitted by the line between node i and node j; and the power output constraint of the energy storage converter is expressed by the following formula:

$$\underline{P}_i \leq P_{Gi} \leq \overline{P}_i$$

$$\underline{Q}_i \leq Q_{Gi} \leq \overline{Q}_i$$

where $\underline{P}_j$ and $\overline{P}_i$ respectively represent upper and lower limits of the active power output by the energy storage converter of node i; and $\underline{Q}_j$ and $\overline{Q}_i$ respectively represent upper and lower limits of the reactive power output by the energy storage converter of node i.

Compared with the prior art, the above technical solutions conceived by the present disclosure can achieve the following beneficial effects:

The present disclosure designs an optimal power flow-based hierarchical control method for a distributed ESS. In an energy storage cluster, basic power distribution is realized through primary control, a frequency/voltage adjustment correction amount of an energy storage converter is obtained through secondary control based on a consistency algorithm to compensate for a frequency/voltage shift and uneven power distribution that are caused by a droop, and the primary control and the secondary control are combined to realize static error free control for a frequency and a voltage, and accurate power distribution. Between energy storage clusters, tertiary control is performed. Specifically, a central controller is set, a network loss is set as an objective function, a power balance constraint, an operation security constraint, and a power output constraint of an ESS are set for a power system, a fmincon function of MATLAB software is used for nonlinear optimization, a solution of an optimal power flow is calculated and delivered to each cluster as a control signal, a reference voltage of each energy storage cluster is adjusted, and a transmission loss is minimized. The control signal is tracked in real time through the secondary control. The tertiary control can set a constraint to limit a voltage level within a safe operation range (it can be seen from a simulation result that an output voltage is limited within ±0.1 pu), and obtain an optimal voltage operation solution that minimizes a line loss. A only control variable is the reference voltage of each cluster. In this method, no common bus is required, and the control is more flexible, which can effectively reduce the line loss, ensure effectiveness of droop-based secondary control of a distributed ESS, improves system operation efficiency. In addition, an accurate distribution of active and reactive power in the secondary control is not affected, and the frequency stably remains at a rated value.

BRIEF DESCRIPTION OF THE DRAWINGS

FIG. 1 is a flowchart of an optimal power flow-based hierarchical control method for a distributed ESS according to an embodiment of the present disclosure;

DETAILED DESCRIPTION

Figure 2:
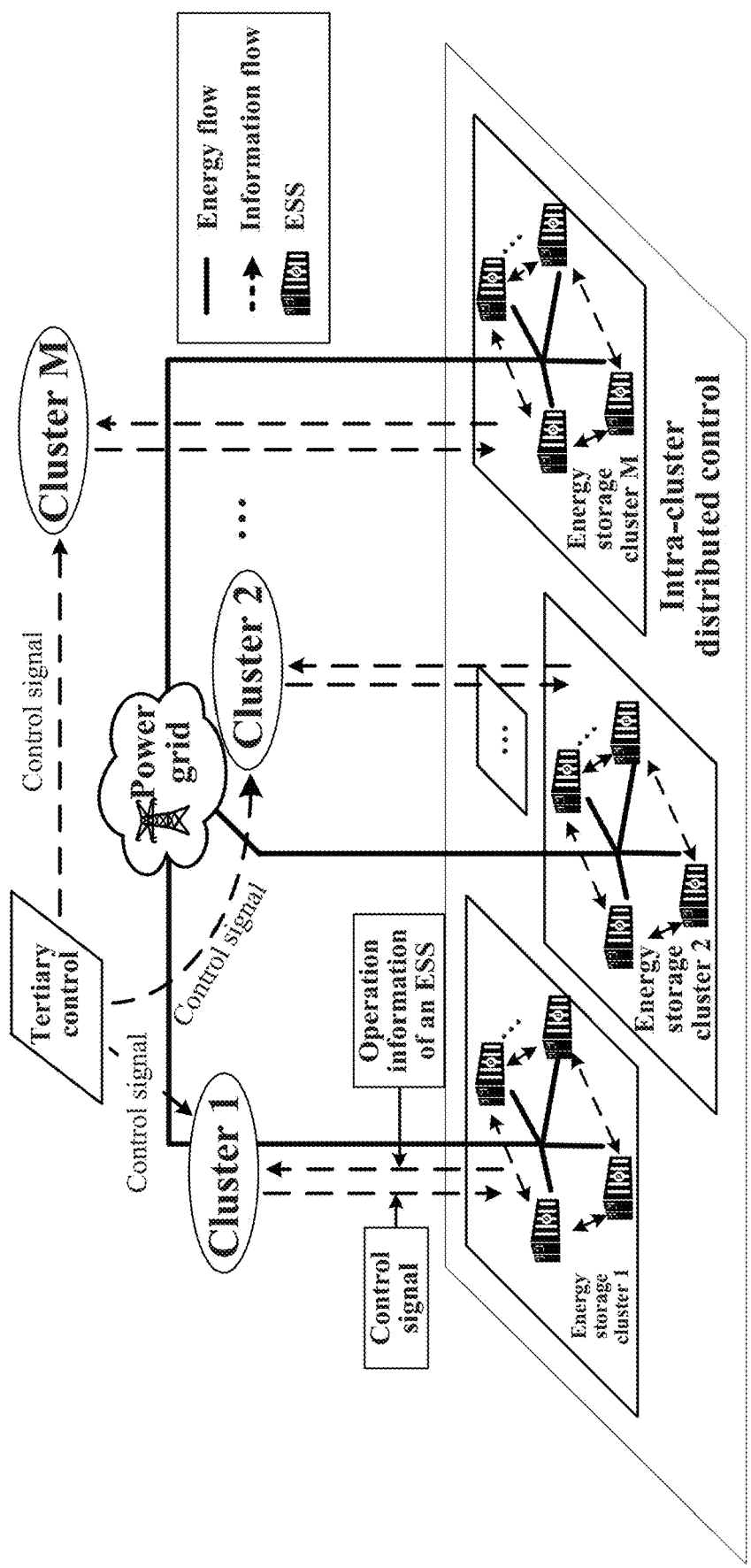
FIG. 2 shows a topology of hierarchical control of a distributed ESS according to an embodiment of the present disclosure.

To make the objectives, technical solutions, and advantages of the present disclosure clearer, the present disclosure is further described below in detail with reference to the accompanying drawings and embodiments. Understandably, the specific embodiments described herein are merely intended to explain the present disclosure but not to limit the present disclosure. Further, the technical features involved in the various embodiments of the present disclosure described below may be combined with each other as long as they do not constitute a conflict with each other.

As shown in FIG. 1, an embodiment of the present disclosure provides an optimal power flow-based hierarchical control method for a distributed ESS, used to perform cluster-based control on a large-scale distributed energy storage cluster. The method specifically includes the following steps.

Step 1: Divide a distributed ESS into a plurality of clusters by distance.

Step 2: Perform tertiary control to realize inter-cluster control. The tertiary control is specifically as follows: setting a central controller, setting a total transmission loss of electric energy as an objective function, setting a power balance constraint, an operation security constraint, and a power output constraint of an energy storage converter for a power system, performing nonlinear optimization by using a fmincon function of MATLAB software, calculating a solution of an optimal power flow and delivering the solution to each cluster as a control signal, and adjusting a reference voltage of each cluster once each time the control signal is sent.

Step 3: Perform primary control and secondary control to realize intra-cluster control. The primary control is specifically as follows: performing basic primary control in the cluster by setting a frequency droop coefficient and a voltage droop coefficient, setting a reference frequency of an output voltage of an energy storage converter to be equal to a value obtained by subtracting active power multiplied by the frequency droop coefficient from a rated frequency, and setting a reference amplitude of the output voltage to be equal to a value by subtracting reactive power multiplied by the voltage droop coefficient from a rated voltage, so as to realize intra-cluster basic power distribution. Further, the secondary control is specifically as follows: performing, based on a consistency algorithm, weighted summation on deviations between state variables of the active and reactive power of the energy storage converter and state variables of active and reactive power of all energy storage converters communicating with the energy storage converter, to obtain a sum value, where a weight used for the weighted summation is a communication weight between the energy storage converters; performing error correction on the sum value to obtain a power distribution adjustment correction amount of the energy storage converter; performing weighted summation on deviations between the power distribution adjustment correction amount of the energy storage converter and power distribution adjustment correction amounts of all the energy storage converters communicating with the energy storage converter, to obtain frequency and voltage adjustment correction amounts of the energy storage converter, where a weight used for the weighted summation is the communication weight between the energy storage converters; and compensating for, based on the frequency and voltage adjustment correction amounts of the energy storage converter, frequency and voltage amplitude shifts of an output voltage of a single energy storage converter and uneven power distribution among a plurality of energy storage converters in the cluster, where the frequency and voltage amplitude shifts and the uneven power distribution are caused by a frequency droop and a voltage droop in the primary control. The intra-cluster secondary control and primary control achieve frequency and voltage recovery and accurate power distribution based on the consistency algorithm, and track in real time the reference voltage delivered in the tertiary control.

As shown in FIG. 2, the primary control and the secondary control are fully distributed and realized through sparse communication between neighbors, and corresponding formulas are as follows:

$$\begin{cases} v_{oki}^d = \underbrace{v_n - n_{ki}Q_{ki} + \Omega_{ki}}_{v_{fki}^d} + T_{ki} \\ v_{oki}^q = v_{fki}^q + \Xi_{ki} \end{cases}$$

$$\omega_{ki} = \omega_n - m_{ki}P_{ki} + \Psi_{ki}$$

where ki represents an $i^{th}$ energy storage converter in a $k^{th}$ cluster, d represents a direct axis, q represents a quadrature axis, $v_{oki}^d$ and $v_{oki}^q$ respectively represent reference values of direct-axis and quadrature-axis components of an output voltage amplitude of the $i^{th}$ energy storage converter in the $k^{th}$ cluster, $\omega_{ki}$ represents a reference frequency of an output voltage of the $i^{th}$ energy storage converter in the $k^{th}$ cluster, $v_n$ and $\omega_n$ represent the rated voltage and the rated frequency respectively, $n_{ki}$ and $m_{ki}$ represent a voltage droop coefficient and a frequency droop coefficient of the $i^{th}$ energy storage converter in the $k^{th}$ cluster respectively, $P_{ki}$ and $Q_{ki}$ respectively represent active power and reactive power output by the $i^{th}$ energy storage converter in the $k^{th}$ cluster, and $\Omega_{ki}$, $T_{ki}$, $\Xi_{ki}$, and $\Psi_{ki}$ represent additional control variables of the $i^{th}$ energy storage converter in the $k^{th}$ cluster, which are defined as follows:

$$\dot{\Omega}_{ki} = -a_{vki}\left[\sum_{j \in N_i^k} a_{ij}^k(v_{fki}^d - v_{fkj}^d) + g_i^k(v_{fki}^d - v_{frefk}^d)\right]$$

$$\dot{T}_{ki} = -a_{Qki}\sum_{j \in N_i^k} a_{ij}^k(n_{ki}Q_{ki} - n_{kj}Q_{kj})$$

$$\dot{\Xi}_{ki} = -a_{vki}\left[\sum_{j \in N_i^k} a_{ij}^k(v_{fki}^q - v_{fkj}^q) + g_i^k(v_{fki}^q - v_{frefk}^q)\right]$$

$$\dot{\Psi}_{ki} = -a_{\omega ki}\left[\sum_{j \in N_i^k} a_{k,ij}(\omega_{ki} - \omega_{kj}) + g_i^k(\omega_{ki} - \omega_{refk})\right] - a_{Pki}\sum_{j \in N_i^k} a_{k,ij}(m_{ki}P_{ki} - m_{kj}P_{kj})$$

where $N_i^k$ represents a set of all energy storage converters communicating with the $i^{th}$ energy storage converter in the $k^{th}$ cluster; $v_{fki}^d$ and $v_{fki}^q$ represent reference values of direct-axis and quadrature-axis components of an intermediate voltage of the $i^{th}$ energy storage converter in the $k^{th}$ cluster respectively; $v_{fkj}^d$ and $v_{fkj}^q$ represent reference values of direct-axis and quadrature-axis components of an intermediate voltage of a $j^{th}$ energy storage converter in the $k^{th}$ cluster respectively; $a_{ij}^k$ represents a communication weight between the $i^{th}$ energy storage converter and the $j^{th}$ energy storage converter in the $k^{th}$ cluster; $a_{vki}$, $a_{Qki}$, $a_{\omega ki}$, and $a_{Pki}$ represent control gains of the voltage, the reactive power, the frequency, and the active power of the $i^{th}$ energy storage converter in the $k^{th}$ cluster respectively; $n_{kj}$ and $m_{kj}$ represent droop coefficients of the $j^{th}$ energy storage converter in the $k^{th}$ cluster; $P_{kj}$ and $Q_{kj}$ respectively represent active power and reactive power output by the $j^{th}$ energy storage converter in the $k^{th}$ cluster; $g_i^k$ represents a leading control gain of the $i^{th}$ energy storage converter in the $k^{th}$ cluster, where when $g_i^k>0$, the energy storage converter directly receives a command value $v_{frefk}^d$ of the direct-axis component of the intermediate voltage and a command value $v_{frefk}^q$ of the quadrature-axis component of the intermediate voltage, or when $g_i^k=0$, the energy storage converter does not receive the command values directly; and $\omega_{refk}$ represents a reference frequency of each energy storage converter in the $k^{th}$ cluster.

As shown in FIG. 2, the tertiary control is centralized and aims to minimize the total transmission loss of the electric energy, a control variable is a reference voltage of each energy storage cluster, and an optimization objective is as follows:

$$\min_{V_{fref}} P_{loss}$$

where $P_{loss}$ represents the total transmission loss of the electric energy, $V_{fref}=[V_{fref1}, \ldots, V_{frefM}]^T$ represents the reference voltage of each energy storage cluster, namely, the control variable, and M represents a quantity of energy storage clusters.

Constraints of the tertiary control include the power balance constraint, the operation security constraint, and the power output constraint of the energy storage converter. The constraints are set to prevent the solution in the tertiary control from making the power and voltage of the power system exceed limits or making the system unstable, which can ensure safe and stable operation of the power system. The constraints can be expressed as formulas.

The power balance constraint is expressed by the following formula:

$$\begin{cases} P_{Gi} - P_{Di} - V_i \sum_j V_j(G_{ij}\cos\theta_{ij} + B_{ij}\sin\theta_{ij}) = 0 \\ Q_{Gi} - Q_{Di} - V_i \sum_j V_j(G_{ij}\sin\theta_{ij} - B_{ij}\cos\theta_{ij}) = 0 \end{cases}$$

where $P_{Gi}$ and $Q_{Gi}$ respectively represent active power and reactive power output by an energy storage converter of node i; $P_{Di}$ and $Q_{Di}$ respectively represent active power and reactive power of a load of node i; $V_i$ represents a voltage amplitude of node i, $V_j$ represents a voltage amplitude of node j; $\theta_{ij}$ represents a difference between voltage phase angles of node i and node j; $G_{ij}$ and $B_{ij}$ respectively represent conductance and susceptance of a line between node i and node j.

The operation security constraint is expressed by the following formula:

$$\underline{V}_{frefk} \leq V_{frefk} \leq \overline{V}_{frefk}$$

$$\underline{P}_{ij} \leq P_{ij} \leq \overline{P}_{ij}$$

$$\underline{Q}_{ij} \leq Q_{ij} \leq \overline{Q}_{ij}$$

where frefk represents a reference voltage of a $k^{th}$ cluster; $\underline{V}_{frefk}$ and $\overline{V}_{frefk}$ represent upper and lower limits of the reference voltage of the $k^{th}$ cluster respectively; $P_{ij}$ and $Q_{ij}$ respectively represent active power and reactive power transmitted by the line between node i and node j; $\underline{P}_{ij}$ and $\overline{P}_{ij}$ respectively represent upper and lower limits of the active power transmitted by the line between node i and node j; and $\underline{Q}_{ij}$ and $\overline{Q}_{ij}$ respectively represent upper and lower limits of the reactive power transmitted by the line between node i and node j.

The power output constraint of the energy storage converter is expressed by the following formula:

$$\underline{P}_i \leq P_{Gi} \leq \overline{P}_i$$
$$\underline{Q}_i \leq Q_{Gi} \leq \overline{Q}_i$$

where $\underline{P}_i$ and $\overline{P}_i$ respectively represent upper and lower limits of the active power output by the energy storage converter of node i; and $\underline{Q}_i$ and $\overline{Q}_i$ respectively represent upper and lower limits of the reactive power output by the energy storage converter of node i.

Figure 3:
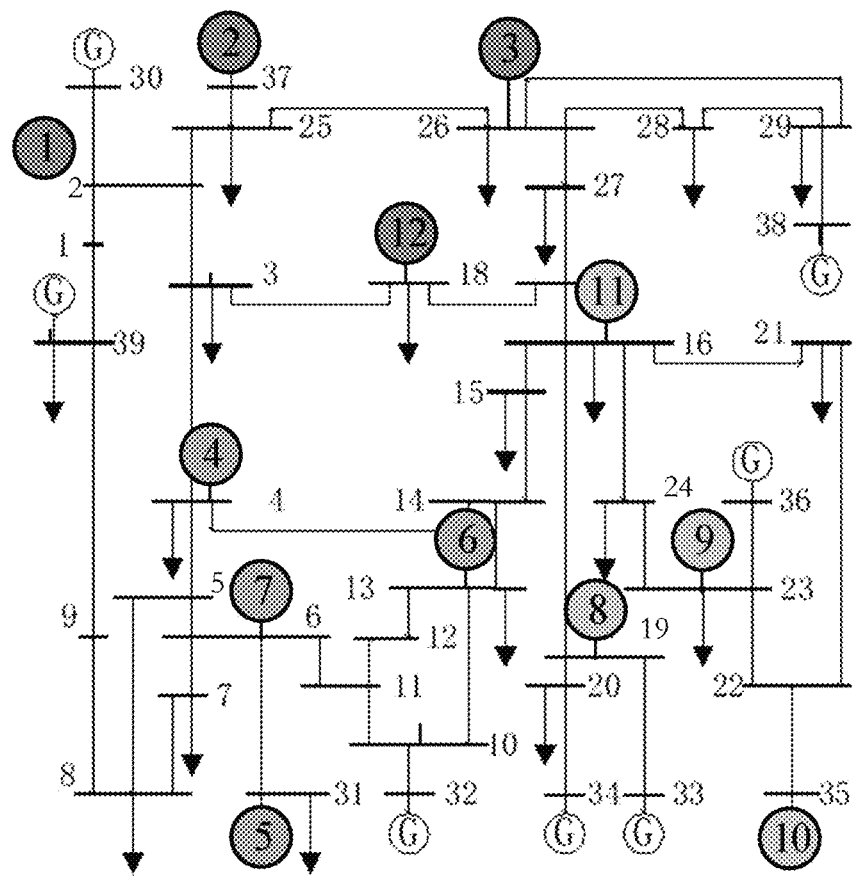
FIG. 3 shows an electrical topology of a test system according to an embodiment of the present disclosure.

As shown in FIG. 3, distributed energy storage units in this embodiment of the present disclosure are scattered on a power grid composed of IEEE 39 nodes, with a rated voltage of 230 V and a rated frequency of 50 Hz.

Figure 4:
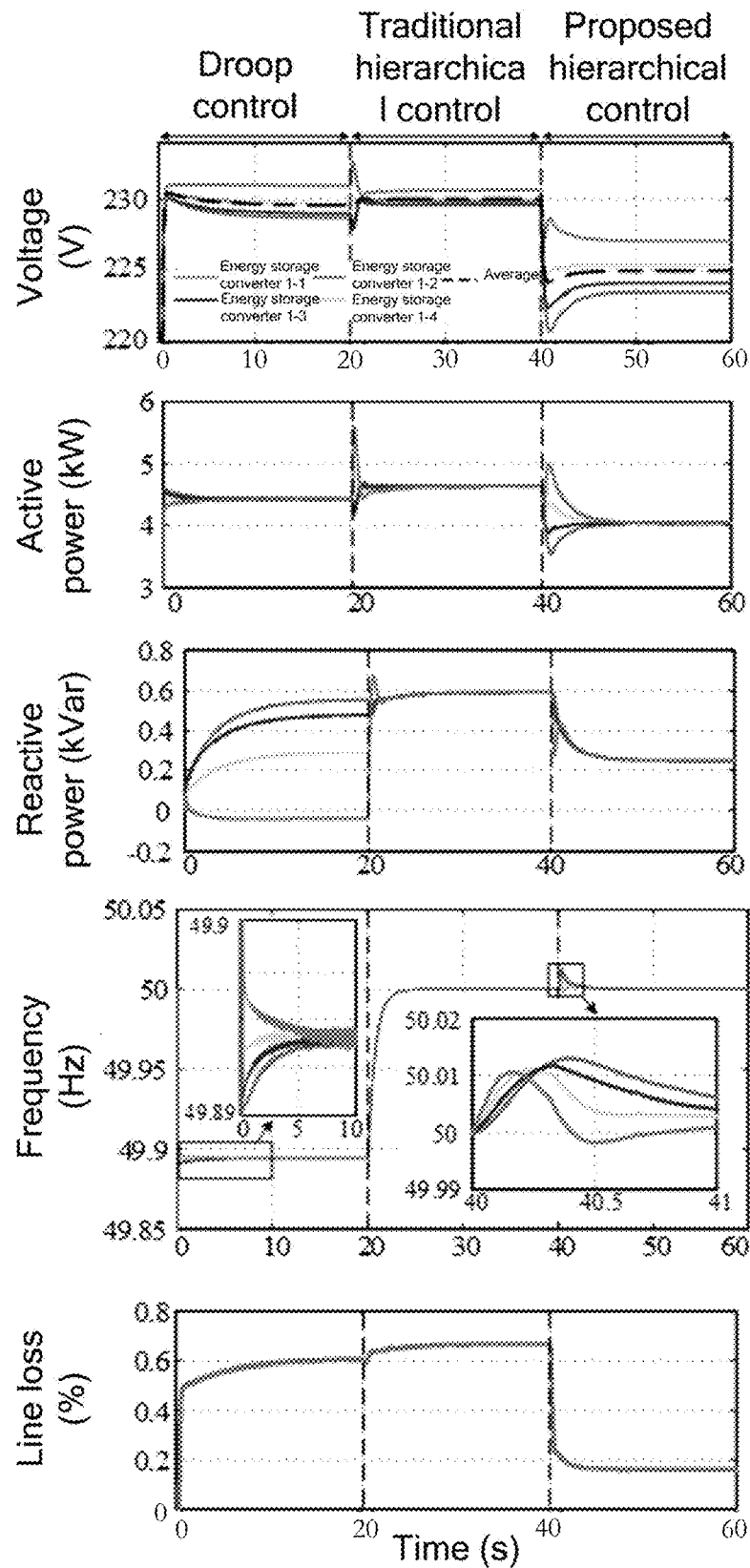
FIG. 4 is a diagram of physical quantities related to energy storage converters in a cluster according to an embodiment of the present disclosure.

As shown in FIG. 4, traditional hierarchical control can effectively eliminate static errors of an average voltage and frequency, and achieve an accurate distribution of active and reactive powers, but it cannot effectively reduce a line loss. The optimal power flow-based hierarchical control method for a distributed ESS in the present disclosure adjusts the reference voltage of each cluster, sets the constraints to limit a voltage level within a safe operation range, and obtains an optimal voltage operation solution that minimizes the line loss. It can be seen from FIG. 4 that the accurate distribution of the active and reactive powers is not affected, the frequency stably remains at a rated value, and only the voltage amplitude is changed. Although the output voltage has a certain shift compared with the traditional hierarchical control, it is effectively limited within the safe operation range (±0.1 p.u.) and does not affect the safe and stable operation of the power system.

It is easy for those skilled in the art to understand that the above-mentioned contents are merely the preferred embodiments of the present disclosure, and are not intended to limit the present disclosure. Any modifications, equivalent substitutions and improvements made within the spirit and principles of the present disclosure should fall within the protection scope of the present disclosure.

The invention claimed is:

1. An optimal power flow-based hierarchical control method for a distributed energy storage system (ESS), used to perform cluster-based control on a large-scale distributed energy storage cluster, the method comprising:
dividing a distributed ESS into a plurality of clusters by distance;
performing tertiary control to realize inter-cluster control; and
performing primary control and secondary control to realize intra-cluster control;
the tertiary control comprising:
setting a central controller,
calculating a solution of an optimal power flow by the central controller,
delivering the solution of the optimal power flow to each cluster as a control signal by the central controller,
adjusting a reference voltage of each cluster by the central controller once each time the control signal is sent, and
tracking the control signal in real time through the secondary control and the primary control;
the primary control comprising:
setting a frequency droop coefficient and a voltage droop coefficient, setting a reference frequency of an output voltage of an energy storage converter to be equal to a value obtained by subtracting active power multiplied by the frequency droop coefficient from a rated frequency, and
setting a reference amplitude of the output voltage to be equal to a value by subtracting reactive power multiplied by the voltage droop coefficient from a rated voltage, so as to realize intra-cluster basic power distribution; and
the secondary control comprising:
performing, based on a consistency algorithm, weighted summation on deviations between state variables of the active and reactive power of the energy storage converter and state variables of active and reactive power of all energy storage converters communicating with the energy storage converter, to obtain a sum value, wherein a weight used for the weighted summation is a communication weight between the energy storage converters;
performing error correction on the sum value to obtain a power distribution adjustment correction amount of the energy storage converter;
performing weighted summation on deviations between the power distribution adjustment correction amount of the energy storage converter and power distribution adjustment correction amounts of all the energy storage converters communicating with the energy storage converter, to obtain frequency and voltage adjustment correction amounts of the energy storage converter, wherein a weight used for the weighted summation is the communication weight between the energy storage converters;
compensating for, based on the frequency and voltage adjustment correction amounts of the energy storage converter, frequency and voltage amplitude shifts of an output voltage of a single energy storage converter and uneven power distribution among a plurality of energy storage converters in the cluster, wherein the frequency and voltage amplitude shifts and the uneven power distribution are caused by a frequency droop and a voltage droop in the primary control; and
wherein the primary control and the secondary control are fully distributed and realized through sparse communication between neighbors, and corresponding formulas are as follows:

$$\begin{cases} v_{oki}^d = v_n - n_{ki}Q_{ki} + \Omega_{ki} + T_{ki} \\ \phantom{v_{oki}^d = } v_{fki}^d \\ v_{oki}^q = v_{fki}^q + \Xi_{ki} \end{cases}$$

$$\omega_{ki} = \omega_n - m_{ki}P_{ki} + \Psi_{ki}$$

wherein ki represents an $i^{th}$ energy storage converter in a $k^{th}$ cluster, d represents a direct axis, q represents a quadrature axis, $v_{oki}^d$ and $v_{oki}^q$ respectively represent reference values of direct-axis and quadrature-axis components of an output voltage amplitude of the $i^{th}$ energy storage converter in the $k^{th}$ cluster, $\omega_{ki}$ represents a reference frequency of an output voltage of the $i^{th}$ energy storage converter in the $k^{th}$ cluster, $v_n$ and $\omega_n$ represent the rated voltage and the rated frequency respectively, $n_{ki}$ and $m_{ki}$ represent a voltage droop coefficient and a frequency droop coefficient of the $i^{th}$ energy storage converter in the $k^{th}$ cluster respectively, $P_{ki}$ and $Q_{ki}$ respectively represent active power and reactive power output by the $i^{th}$ energy storage converter in the $k^{th}$ cluster, and $\Omega_{ki}$, $T_{ki}$, $\Xi_{ki}$, and $\Psi_{ki}$ represent additional control variables of the $i^{th}$ energy storage converter in the $k^{th}$ cluster, which are defined as follows:

$$\dot{\Omega}_{ki} = -a_{vki}\left[\sum_{j\in N_i^k} a_{ij}^k(v_{fki}^d - v_{fkj}^d) + g_i^k(v_{fki}^d - v_{frefk}^d)\right]$$

$$\dot{T}_{ki} = -a_{Qki}\sum_{j\in N_i^k} a_{ij}^k(n_{ki}Q_{ki} - n_{kj}Q_{kj})$$

$$\dot{\Xi}_{ki} = -a_{vki}\left[\sum_{j\in N_i^k} a_{ij}^k(v_{fki}^q - v_{fkj}^q) + g_i^k(v_{fki}^q - v_{frefk}^q)\right]$$

$$\dot{\Psi}_{ki} = -a_{\omega ki}\left[\sum_{j\in N_i^k} a_{k,ij}(\omega_{ki}-\omega_{kj}) + g_i^k(\omega_{ki}-\omega_{refk})\right] - a_{Pki}\sum_{j\in N_i^k} a_{k,ij}(m_{ki}P_{ki}-m_{kj}P_{kj})$$

wherein $N_i^k$ represents a set of all energy storage converters communicating with the $i^{th}$ energy storage converter in the $k^{th}$ cluster; $v_{fki}^d$ and $v_{fki}^q$ represent reference values of direct-axis and quadrature-axis components of an intermediate voltage of the $i^{th}$ energy storage converter in the $k^{th}$ cluster respectively; $v_{fkj}^d$ and $v_{fkj}^q$ represent reference values of direct-axis and quadrature-axis components of an intermediate voltage of a $j^{th}$ energy storage converter in the $k^{th}$ cluster respectively; $a_{ij}^k$ represents a communication weight between the $i^{th}$ energy storage converter and the $j^{th}$ energy storage converter in the $k^{th}$ cluster; $a_{vki}$, $a_{Qki}$, $a_{\omega ki}$, and $a_{Pki}$ represent control gains of the voltage, the reactive power, the frequency, and the active power of the $i^{th}$ energy storage converter in the $k^{th}$ cluster respectively; $g_i^k$ represents a leading control gain of the $i^{th}$ energy storage converter in the $k^{th}$ cluster, wherein when $g_i^k > 0$, the energy storage, converter directly receives a command value $v_{frefk}^d$ of the direct-axis component of the intermediate voltage and a command value $v_{frefk}^q$ of the quadrature-axis component of the intermediate voltage, or when $g_i^k = 0$, the energy storage converter does not receive the command values directly; and $\omega_{refk}$ represents a reference frequency of each energy storage converter in the $k^{th}$ cluster.

2. The method according to claim 1, wherein the tertiary control is centralized and aims to minimize a total transmission loss of electric energy, a control variable is a reference voltage of each energy storage cluster, and an optimization objective is as follows:

$$\min_{V_{fref}} P_{loss}$$

wherein $P_{loss}$ represents the total transmission loss of the electric energy, $V_{fref} = [V_{fref1}, \ldots, V_{frefM}]^T$ represents the reference voltage of each energy storage cluster, namely, the control variable, and M represents a quantity of energy storage clusters.

3. The method according to claim 2, wherein constraints considered in the tertiary control comprise a power balance constraint, an operation security constraint, and a power output constraint of the energy storage converter;

the power balance constraint is expressed by a following formula:

$$\begin{cases} P_{Gi} - P_{Di} - V_i\sum_j V_j(G_{ij}\cos\theta_{ij} + B_{ij}\sin\theta_{ij}) = 0 \\ Q_{Gi} - Q_{Di} - V_i\sum_j V_j(G_{ij}\sin\theta_{ij} - B_{ij}\cos\theta_{ij}) = 0 \end{cases}$$

wherein $P_{Gi}$ and $Q_{Gi}$ respectively represent active power and reactive power output by an energy storage converter of node i; $P_{Di}$ and $Q_{Di}$ respectively represent active power and reactive power of a load of node i; $V_i$ represents a voltage amplitude of node i, $V_j$ represents a voltage amplitude of node j; $\theta_{ij}$ represents a difference between voltage phase angles of node i and node j; $G_{ij}$ and $B_{ij}$ respectively represent conductance and susceptance of a line between node i and node j;

the operation security constraint is expressed by a following formula:

$$\underline{V}_{frefk} \leq V_{frefk} \leq \overline{V}_{frefk}$$
$$\underline{P}_{ij} \leq P_{ij} \leq \overline{P}_{ij}$$
$$\underline{Q}_{ij} \leq Q_{ij} \leq \overline{Q}_{ij}$$

wherein $V_{frefk}$ represents a reference voltage of a $k^{th}$ cluster; $\underline{V}_{frefk}$ and $\overline{V}_{frefk}$ represent upper and lower limits of the reference voltage of the $k^{th}$ cluster respectively; $P_{ij}$ and $Q_{ij}$ respectively represent active power and reactive power transmitted by the line between node i and node j; $\underline{P}_{ij}$ and $\overline{P}_{ij}$ respectively represent upper and lower limits of the active power transmitted by the line between node i and node j; and $\underline{Q}_{ij}$ and $\overline{Q}_{ij}$ respectively represent upper and lower limits of the reactive power transmitted by the line between node i and node j; and the power output constraint of the energy storage converter is expressed by a following formula:

$$\underline{P}_i \leq P_{Gi} \leq \overline{P}_i$$
$$\underline{Q}_i \leq Q_{Gi} \leq \overline{Q}_i$$

wherein $\underline{P}_i$ and $\overline{P}_i$ respectively represent upper and lower limits of the active power output by the energy storage converter of node i; and $\underline{Q}_i$ and $\overline{Q}_i$ respectively represent upper and lower limits of the reactive power output by the energy storage converter of node i.

* * * * *